United States Patent
Cheng et al.

(10) Patent No.: US 10,699,732 B2
(45) Date of Patent: Jun. 30, 2020

(54) DEVICES INCLUDING A DIFFUSION BARRIER LAYER

(71) Applicant: SEAGATE TECHNOLOGY LLC, Cupertino, CA (US)

(72) Inventors: Yuhang Cheng, Edina, MN (US); Scott Franzen, Savage, MN (US); Michael Seigler, Eden Prairie, MN (US); James Wessel, Savage, MN (US); Tong Zhao, Eden Prairie, MN (US); John Duda, Bloomington, MN (US); Sarbeswar Sahoo, Shakopee, MN (US); Hui Brickner, Savage, MN (US); Michael Kautzky, Eagan, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/828,391

(22) Filed: Nov. 30, 2017

(65) Prior Publication Data
US 2018/0090160 A1    Mar. 29, 2018

Related U.S. Application Data

(63) Continuation of application No. 14/935,768, filed on Nov. 9, 2015, now abandoned.

(60) Provisional application No. 62/078,101, filed on Nov. 11, 2014.

(51) Int. Cl.
  *G11B 5/31* (2006.01)
  *G11B 5/00* (2006.01)

(52) U.S. Cl.
  CPC ........... *G11B 5/314* (2013.01); *G11B 5/3106* (2013.01); *G11B 2005/0021* (2013.01)

(58) Field of Classification Search
  None
  See application file for complete search history.

(56) References Cited

U.S. PATENT DOCUMENTS

| | | |
|---|---|---|
| 7,002,228 B2 | 2/2006 | Deak |
| 7,262,936 B2 | 8/2007 | Hamann |
| 7,791,839 B2 | 9/2010 | Olson |
| 8,116,034 B2 | 2/2012 | Komura |
| 8,213,272 B2 | 7/2012 | Takayama |
| 8,223,597 B2 | 7/2012 | Komura |
| 8,284,521 B2 | 10/2012 | Ohtsu |
| 8,339,740 B2 | 12/2012 | Zou |
| 8,477,454 B2 | 7/2013 | Zou |
| 8,503,270 B1 | 8/2013 | Kawamori |
| 8,670,215 B2 | 3/2014 | Zou |
| 9,449,625 B1 | 9/2016 | Vossough |
| 2005/0190496 A1 | 9/2005 | Hamann |
| 2006/0114607 A1 | 6/2006 | Pinarbasi |
| 2007/0069383 A1 | 3/2007 | Suzuki |
| 2009/0073858 A1 | 3/2009 | Seigler |
| 2010/0128579 A1 | 5/2010 | Seigler |

(Continued)

OTHER PUBLICATIONS

PCT International Search Report and Written Opinion dated Mar. 31, 2016 for PCT/US2015/059673 (11 pages).

*Primary Examiner* — Brian M Butcher
(74) *Attorney, Agent, or Firm* — Mueting Raasch Group

(57) ABSTRACT

Devices that include a write pole; a near field transducer (NFT) that includes a peg and a disk, wherein the peg is at the ABS of the device; and a diffusion barrier layer positioned between the write pole and the peg of the NFT, the diffusion barrier layer including metals, nitrides, oxides, carbides, silicides, or amorphous material.

20 Claims, 3 Drawing Sheets

(56) References Cited

U.S. PATENT DOCUMENTS

| | | |
|---|---|---|
| 2010/0214685 A1 | 8/2010 | Seigler |
| 2010/0309581 A1 | 12/2010 | Wu |
| 2011/0002199 A1 | 1/2011 | Takayama |
| 2012/0045662 A1 | 2/2012 | Zou |
| 2012/0105996 A1 | 5/2012 | Katine |
| 2012/0127839 A1 | 5/2012 | Rawat |
| 2013/0070576 A1 | 3/2013 | Zou |
| 2013/0343167 A1 | 12/2013 | Zou |
| 2014/0050057 A1 | 2/2014 | Zou |
| 2014/0050058 A1 | 2/2014 | Zou |
| 2014/0376342 A1 | 12/2014 | Wessel |
| 2016/0133280 A1 | 5/2016 | Cheng |
| 2016/0275979 A1 | 9/2016 | Sahoo |

DEVICES INCLUDING A DIFFUSION BARRIER LAYER

PRIORITY

This application is a continuation of U.S. Utility application Ser. No. 14/935,768 entitled DEVICES INCLUDING A DIFFUSION BARRIER LAYER, filed on Nov. 9, 2015, which claims priority to U.S. Provisional Application No. 62/078,101 entitled, DIFFUSION BARRIER LAYER FOR HAMR NFT, filed on Nov. 11, 2014, the disclosures of which are incorporated herein by reference thereto.

SUMMARY

Disclosed are devices that include a write pole; a near field transducer (NFT) that includes a peg and a disk, wherein the peg is at the ABS of the device; and a diffusion barrier layer positioned between the write pole and the peg of the NFT, the diffusion barrier layer including metals, nitrides, oxides, carbides, silicides, or amorphous material.

Also disclosed are devices having an air bearing surface (ABS), the devices including a write pole; a near field transducer (NFT) that includes a peg and a disk, wherein the peg is at the ABS of the device; and a diffusion barrier layer positioned between the write pole and the peg of the NFT, the diffusion barrier layer having a thickness from about 0.1 nm to about 50 nm and including one or more materials selected from: molybdenum (Mo), niobium (Nb), nickel (Ni), hafnium (Hf), neodymium (Nd), holmium (Ho), zirconium (Zr), yttrium (Y), uranium (U), iridium (Ir), silicon (Si), tantalum (Ta), tungsten (W), titanium (Ti), rhodium (Rh), and ruthenium (Ru); aluminum nitride (AlN), boron nitride (BN), zirconium nitride (ZrN), chromium nitride (CrN), titanium nitride (TiN), hafnium nitride (HfN), vanadium nitride (VN); titanium aluminum nitride (TiAlN), and titanium silicon nitride (TiSiN); aluminum oxide (AlO), magnesium oxide (MgO), beryllium oxide (BeO), titanium oxide (TiO), tantalum oxide (TaO), niobium oxide (NbO), vanadium oxide (VO), tungsten oxide (WO), zirconium oxide (ZrO), hafnium oxide (HfO), silicon oxide (SiO), and chromium oxide (CrO); titanium carbide (TiC), zirconium carbide (ZrC), niobium carbide (NbC), vanadium carbide (VC), hafnium carbide (HfC), silicon carbide (SiC), chromium carbide (CrC), tantalum carbide (TaC) and tungsten carbide (WC); and amorphous material.

Also disclosed are devices having an air bearing surface (ABS), the device including a write pole; a near field transducer (NFT) including a peg and a disk, wherein the peg is at the ABS of the device; a dielectric material positioned between the NFT and the pole (NPS) at the ABS of the device; and a diffusion barrier layer intersecting the disk of the NFT and positioned between the NPS and the pole.

Also disclosed are devices having an air bearing surface (ABS), the devices including a write pole; a near field transducer (NFT) including a peg and a disk, wherein the peg is at the ABS of the device; a dielectric material positioned between the NFT and the pole (NPS) at the ABS of the device and a diffusion barrier layer positioned between the write pole and the peg of the NFT, the diffusion barrier layer including one or more materials selected from: molybdenum (Mo), niobium (Nb), nickel (Ni), hafnium (Hf), neodymium (Nd), holmium (Ho), zirconium (Zr), yttrium (Y), uranium (U), iridium (Ir), silicon (Si), tantalum (Ta), tungsten (W), titanium (Ti), rhodium (Rh), and ruthenium (Ru); aluminum nitride (AlN), boron nitride (BN), zirconium nitride (ZrN), chromium nitride (CrN), titanium nitride (TiN), hafnium nitride (HfN), vanadium nitride (VN), tungsten nitride (WN), tantalum nitride (TaN), titanium aluminum nitride (TiAlN), and titanium silicon nitride (TiSiN); aluminum oxide (AlO), magnesium oxide (MgO), beryllium oxide (BeO), titanium oxide (TiO), tantalum oxide (TaO), niobium oxide (NbO), vanadium oxide (VO), tungsten oxide (WO), zirconium oxide (ZrO), hafnium oxide (HfO), silicon oxide (SiO), and chromium oxide (CrO); titanium carbide (TiC), zirconium carbide (ZrC), niobium carbide (NbC), vanadium carbide (VC), hafnium carbide (HfC), silicon carbide (SiC), chromium carbide (CrC), tantalum carbide (TaC) and tungsten carbide (WC); and amorphous material.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

The high temperatures that the NFT and surrounding structures reach during operation can lead to diffusion of the material of the write pole (e.g., iron (Fe) and cobalt (Co) atoms) towards the NFT through any of a number of interfaces because of the relatively high diffusion coefficients at the interfaces. Diffusion of the write pole material (e.g., Fe and Co) along the interfaces will change the composition and therefore optical properties of the peg, the cladding surrounding the NFT at the pole (e.g., the NFT to pole space—"NPS"), and the cladding surrounding the NFT at the core of the waveguide (e.g., the core to NFT space—"CNS"). These altered compositions will degrade the performance of the HAMR head and may cause early failure of the NFT.

Disclosed devices include diffusion barriers designed and configured to minimize or eliminate diffusion of the write pole material along the interfaces. Specifically, a diffusion barrier layer can be added to at least part of the pole/NPS interface, the pole/NFT interface, or both to prevent or minimize diffusion of the write pole material through the NPS/pole and NPS/NFT interfaces.

Figure 1:
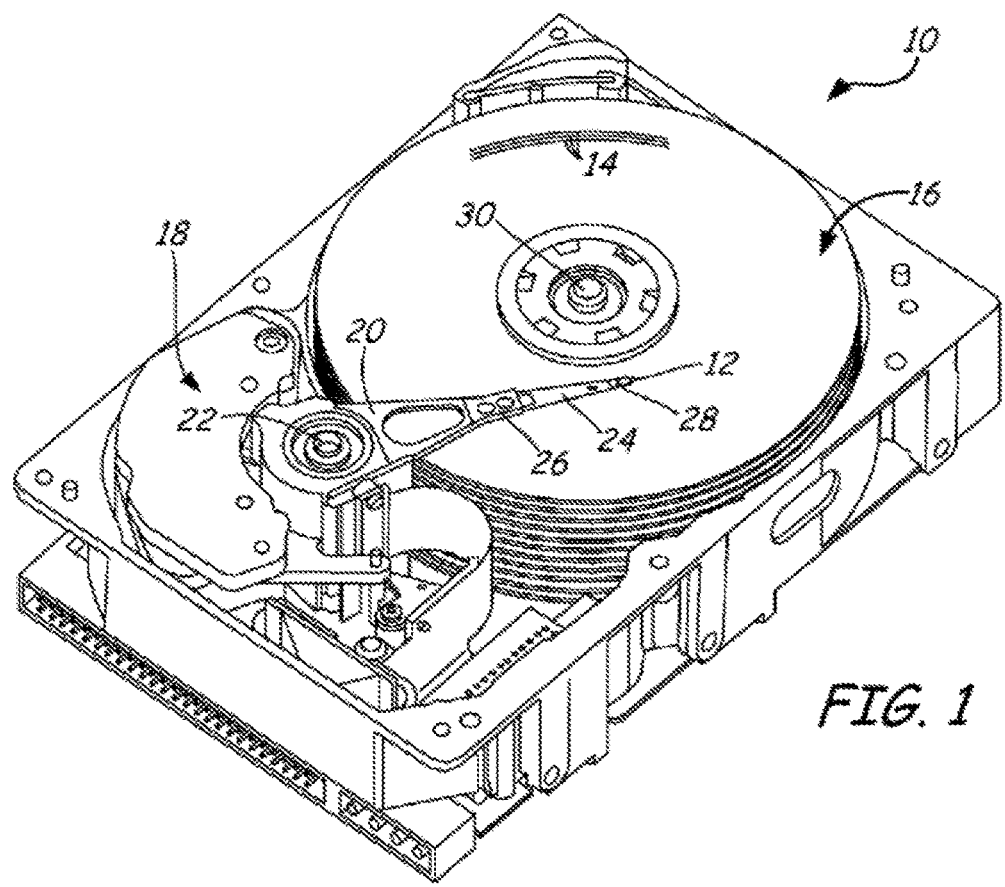
FIG. 1 is a perspective view of a magnetic disc drive that can include HAMR devices.

FIG. 1 is a perspective view of disc drive 10 including an actuation system for positioning slider 12 over track 14 of magnetic medium 16. The system depicted in FIGS. 1 and 2 can include disclosed structures and multilayer gas barrier layers. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
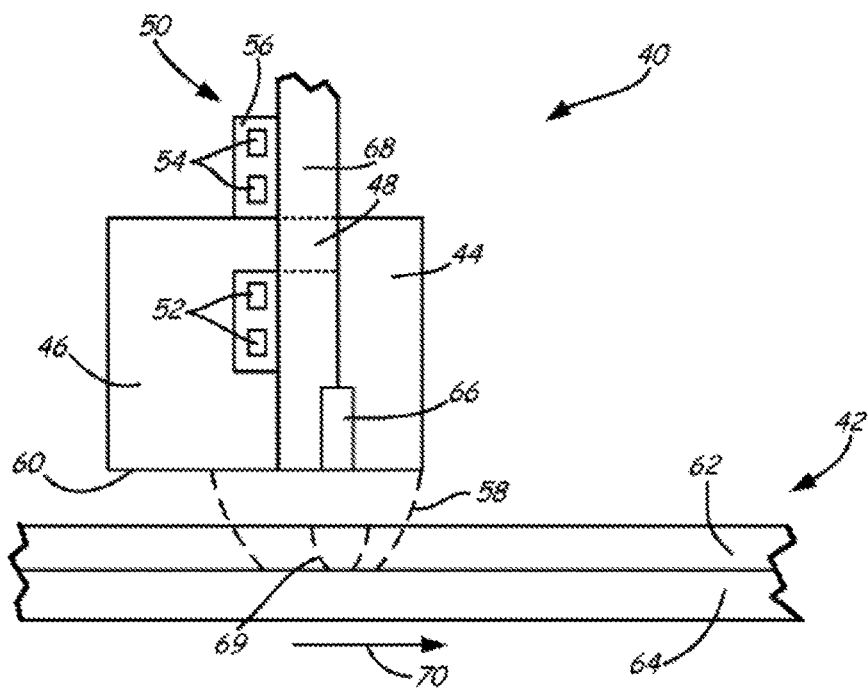
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium. As can be seen in FIG. 2, a portion of the near field transducer is positioned at the ABS 60 of the device.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIGS. 1 and 2.

Figure 3:
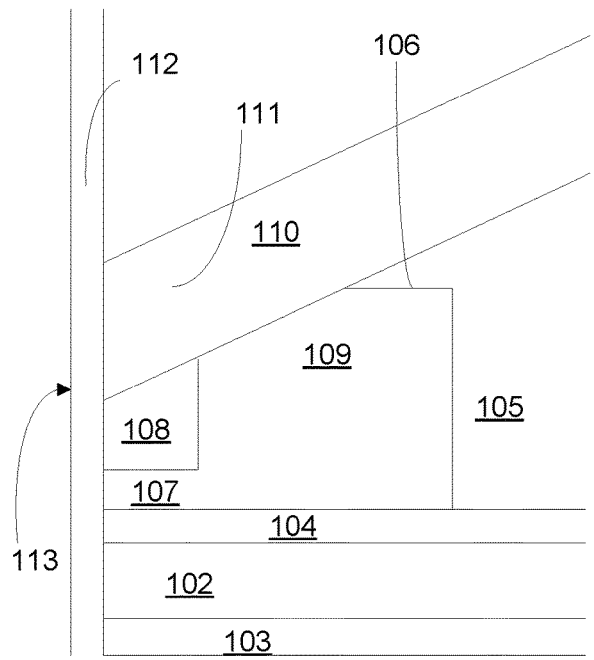
FIG. 3 is a cross-sectional view of a portion of an illustrative HAMR magnetic recording head disclosed herein.

FIG. 3 shows an enlarged view of a portion of HAMR magnetic recording head. The recording head includes a magnetic pole 110 that can be made of CoFe for example and includes a sloped portion 111 having an end 112 positioned adjacent an air bearing surface (ABS) 113. The air bearing surface 113 can be covered with or is defined by an overcoat layer 112. The head also includes a waveguide that includes a core layer 102 sandwiched cladding layers. Beneath the core 102 is the second cladding layer 103 and above it is the first cladding layer. In this illustrated embodiment, a portion of the first cladding layer is referred to as the core to NFT space, or CNS 104. The first cladding layer also includes the back cladding 105. The CNS 104 is positioned between the near field transducer 106 and the core layer 102. Adjacent the air bearing surface 113 is also additional cladding, referred to as the NFT to pole space, or NPS 108. The NFT 106 can be considered as being made up of two portions, the peg 107 and the disc 109.

In some embodiments, the NFT can be made of a plasmonic material. Illustrative NFT materials can include plasmonic materials such as gold (Au), silver (Ag), aluminum (Al), copper (Cu), ruthenium (Ru), rhodium (Rh), iridium (Ir), or alloys thereof; titanium nitride (TiN), zirconium nitride (ZrN), or combinations thereof; thermally conductive oxides; indium tin oxide (ITO); and combinations thereof. In NFTs made of materials having relatively low oxidation resistance (e.g., Rh, TiN, ZrN, etc.), oxidation of the NFT may lead to loss of functionality of the NFT. In such embodiments, gas barrier properties become even more important. In some embodiments, illustrative NFT materials can also include those disclosed in U.S. Patent Publication No. 2013/0286799; and U.S. Pat. Nos. 8,830,800, 8,427,925, and 8,934,198; the disclosures of which are incorporated herein by reference thereto.

The CNS 104, NPS 108, first cladding layer 103 and back cladding layer 105, as well as additional cladding material not specifically pictured or discussed herein can be made of the same or different material. Any of the cladding layers or structures can generally be formed from dielectric materials having low (relative to the material of the NFT) index of refractions. Illustrative materials can include $Ta_2O_5$, $Al_2O_3$, $SiO_2$, MgO, $MgF_2$, $Si_3N_4$, SiON, and $TaSiO_x$. Materials disclosed in United States Patent Publication No. 2011/0205864, entitled "Optical Waveguide Clad Material", filed Feb. 23, 2011, the disclosure of which is incorporated herein by reference thereto to the extent it does not conflict, can also be utilized for any of the cladding layers or structures. In embodiments, the cladding layers or structures can be made of $Al_2O_3$ or $SiO_2$ for example.

In previously utilized HAMR heads (as well as non-HAMR heads), atoms from the write pole (e.g., iron (Fe), cobalt (Co), both, or other atoms from non FeCo poles) can diffusion through the NPS/pole interface, NPS/NFT interface, or both. This diffusion can cause the composition of the NPS, the peg, the CNS, or any combination thereof to be changed. This can lead to failure of the NFT or decreased head performance, or both. To combat this, disclosed magnetic recording heads include diffusion barrier layer(s) configured to decrease or prevent the diffusion of the write pole materials through the NPS/pole interface, the NPS/NFT interface, or both.

Figure 4A:
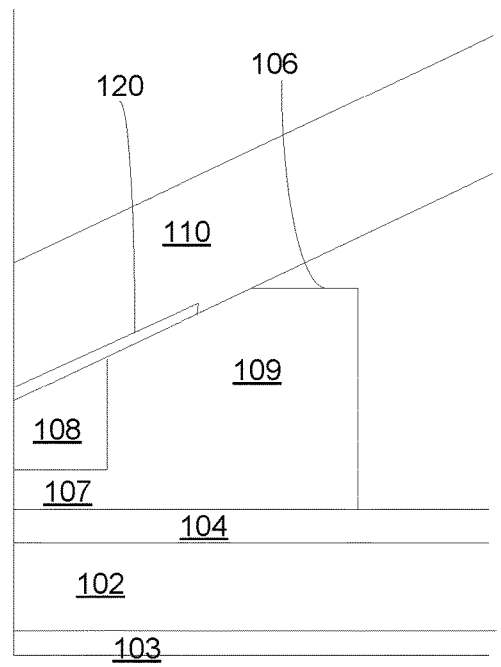
FIGS. 4A and 4B are cross-sectional views of a portion of an illustrative HAMR magnetic recording head disclosed herein that include a diffusion barrier layer.

In some embodiments, a diffusion barrier layer can be added to at least part of the pole/NPS interface and the pole/NFT interface to prevent or minimize diffusion of the write pole atoms through the NPS/pole interface, NPS/NFT interface, or both. In some embodiments, a diffusion barrier layer that extends all the way from the ABS surface to the back end of the disc can be added. FIG. 4A shows an illustrative magnetic recording head that includes a diffusion barrier layer. The head includes the same elements as the head in FIG. 3, numbered the same. Specifically, the head includes a write pole 110, a NPS 108, and a NFT 106 that includes a disc 109 and a peg 107. Also included in this head is a diffusion barrier layer 120. The diffusion barrier layer 120 is positioned between at least the pole 110 and the cladding of the NPS 108. As such, the diffusion barrier layer 120 can prevent or minimize diffusion of the write pole atoms through the NPS/pole interface. Such a diffusion barrier layer can be formed by depositing diffusion barrier material (discussed below) as a sheet film under the write pole plating seed.

Figure 4B:
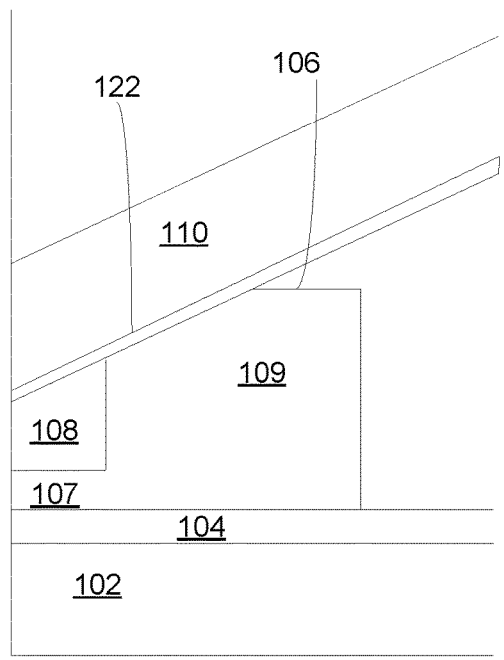

FIG. 4B shows another illustrative magnetic recording head that includes a diffusion barrier layer. The head includes the same elements as the head in FIG. 3, numbered the same. Specifically, the head includes a write pole 110, a NPS 108, and a NFT 106 that includes a disc 109 and a peg 107. Also included in this head is a diffusion barrier layer 122. The diffusion barrier layer 122 is positioned between the NPS 108 and the disc 109 of the NFT and the pole 110. The diffusion barrier layer 122 covers more of the NFT/pole interface than the diffusion barrier layer 120 of FIG. 4A did. Such a diffusion barrier layer 122 could reduce the amount of write pole atoms diffusing through both the NPS/pole and the NFT/pole interfaces. Such a diffusion barrier layer can be formed by depositing diffusion barrier material (discussed below) as a sheet film under the write pole plating seed.

Diffusion barrier layers, whether they cover the NPS/pole interface, the NFT/pole interface, or both can be described by the thickness thereof. In some illustrative embodiments, the diffusion barrier layer can have a thickness of not less than 0.1 nanometers (nm), or not less than 0.2 nm. In some illustrative embodiments, the diffusion barrier layer can have a thickness of not greater than 100 nm, not greater than 50 nm, or not greater than 20 nm.

In some embodiments, a diffusion barrier layer could also include more than one layer. Such multilayer diffusion barrier layers can include multiple layers, where each layer is chosen for a particular purpose. For example, one sublayer of the multilayer diffusion barrier layer can be chosen specifically to prevent or minimize diffusion into or out of the underlying NFT (e.g., gold) and a second sublayer can be chosen specifically to prevent or minimize diffusion out of or into the overlying write pole (e.g., FeCo). In some embodiments, multilayer diffusion layers can include sublayers that are relatively thin so the overall structure does not have a thickness greater than 100 nm, greater than 50 nm, or even not greater than 20 nm, for example. Alternatively, or in addition, the diffusion layer can be removed from the ABS so that it is not overlying the NPS.

Figure 5A:
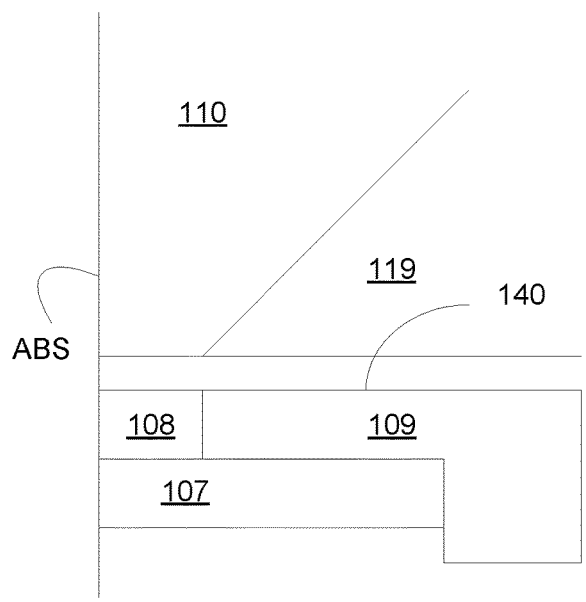
FIGS. 5A and 5B are cross-sectional (FIG. 5A) and top down (FIG. 5B) views of a portion of an illustrative HAMR magnetic recording head disclosed herein that include a diffusion barrier layer that intersects the disk of the peg.

FIG. 5A shows a portion of a magnetic recording head that includes a different configuration of a diffusion barrier layer. In such heads, the diffusion barrier intersects the disc of the NFT. At the ABS, the diffusion barrier layer is placed between the write pole and the NPS and then extends back through the disc of the NFT. Such a diffusion barrier layer can be deposited after the NPS has been formed, e.g., by using a chemical mechanical polishing (CMP) technique. Then the remainder of the disk can be formed on top of the diffusion barrier layer. The specific illustrated embodiment in FIG. 5A includes a peg 107 and a disc that is made up of the heatsink disk 119 and the bottom disk 109. Separating the disc into two portions is the diffusion barrier layer 140. The diffusion barrier layer 140 separates the NPS 108 from the pole 110 at the ABS.

In some embodiments, it can be advantageous for the diffusion barrier layer to be as close to the ABS as possible in order to minimize interaction of the material of the diffusion barrier layer with light from the waveguide/NFT. Specifically, the farther back (away from the ABS) the diffusion barrier layer exists, the more likely it is to interact with or be in the light path before it is gathered by the NFT or once it has entered the NFT. The farther the diffusion barrier layer extends back away from the ABS, the light absorption by it may lead to a temperature rise in the diffusion barrier layer that could reduce reliability of the overall head.

Figure 5B:
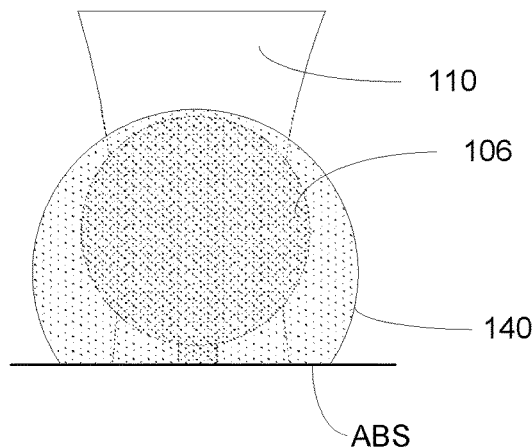

In some embodiments where the diffusion barrier layer intersects the disk of the NFT, the configuration of the diffusion barrier layer can be described by how it relates to the disk of the NFT. For example, in some embodiments, the diffusion barrier layer can have a shape that relates to the shape of the disk. For example, the disk can generally be circular (when viewed from above). In some embodiments, the diffusion barrier layer can also be substantially circular. In some embodiments, the diffusion barrier layer can be circular but for a portion that is cut off by the ABS. Such a configuration is illustrated in FIG. 5B. The head in such configurations includes the pole 110, the disc 106 of the NFT and a diffusion barrier layer 140. As seen from FIG. 5B, the diffusion barrier layer 140 is substantially circular but for the front portion that has been cut off at the ABS. Such a configuration may be advantageous because it minimizes the overlap between the disc and the rear portion of the NFT. This can be beneficial because the diffusion barrier layer is then less likely to interact with light entering the NFT or light in the NFT. In some illustrative configurations, the diffusion barrier layer (if an entire circle) could have a diameters of not greater than about 400 nm, in some embodiments not greater than 375 nm, or in some embodiments, not greater than 350 nm. In some illustrative configurations, the diffusion barrier layer (if an entire circle) could have a diameter of not less than about 275 nm, not less than 285 nm, or not less than 295 nm. In some illustrative embodiments, the diffusion barrier layer could have a diameter of about 300 nm or about 350 nm.

The diffusion barrier layer can also have a shape that is substantially the same as that of the write pole. In some embodiments, a diffusion barrier layer can have a shape that is substantially the same as the shape of the write pole in the region where the NFT overlies the write pole.

Diffusion barrier layers, whether they cover the NPS/pole interface, the NFT/pole interface, or both or whether they intersect the disk of the NFT, can be made of any number of materials. The particular materials chosen can be based on a number of properties. For example, the solubility of the possible diffusion barrier layer material in the material of the write pole, the NFT, or both can be considered. In some embodiments, the particular material chosen can have a solubility in the write pole, the NFT, or both that is relatively low. In some embodiments, the particular material chosen can have a solubility in the write pole, the NFT, or both that is relatively low even at elevated temperatures (e.g., greater or equal to about 100° C.). Alternatively, or in addition, the diffusion rate of the possible diffusion barrier layer material in the material of the write pole, the NFT, or both can be considered. In some embodiments, the particular material chosen can have a diffusion rate in the write pole, the NFT, or both that is relatively low. In some embodiments, the particular material chosen can have a diffusion rate in the write pole, the NFT, or both that is relatively low even at elevated temperatures (e.g., greater or equal to about 100° C.).

Alternatively, or in addition, the thermal stability of the possible diffusion barrier layer material can be considered. In some embodiments, a material or materials for a diffusion barrier layer can have a relatively high thermal stability so that the layer can maintain or substantially maintain its physical shape and dimensions. In some embodiments, a material or materials for a diffusion barrier layer can have a relatively high melting point. The thermal conductivity of the material for the diffusion barrier layer can also be considered. Addition of a diffusion barrier layer between the pole and the NFT could affect the thermal conduction from the NFT to the pole, which could significantly affect the reliability of the HAMR head. This can be at least partially compensated for by having the diffusion barrier layer cover only part of the NFT, still affording the NFT direct thermal contact with the pole to allow heat to be dissipated to the pole. Additionally, or instead of that the diffusion barrier layer material can be one that has a relatively high thermal conductivity to allow heat to be dissipated to the diffusion barrier layer material.

Alternatively, or in addition, the oxidation resistance of the possible material for the diffusion barrier layer can be considered. During HAMR writing, reactive gases, (e.g., $O_2$, $H_2O$, HF, or others) could permeate through the overcoat layer (112) and react with the diffusion barrier layer. Such reactions could change the mechanical, physical, and chemical properties of the diffusion barrier layer, generate internal stress, create defects in the layer, or combinations thereof. Therefore, materials that are relatively resistant to reaction with reactive gases (e.g., $O_2$, $H_2O$, HF, or others) could be useful.

The material of the diffusion barrier layer can also be chosen based on optical properties. In some embodiments, a material or materials for the diffusion barrier layer can have relatively low n and relatively high k to reduce the amount of light absorbed by the diffusion barrier layer.

The material of the diffusion barrier layer can also be chosen based on the ability of the material to adhere to or remain adhered to the overcoat. If the diffusion barrier layer does not adhere well to the head overcoat material, the write pole atoms could diffuse through the NPS/overcoat interface.

By considering the above noted properties and additionally properties not discussed herein, material(s) for the diffusion barrier layer can be chosen. In some illustrative embodiments, the materials could include metals, oxides, nitrides, carbides, silicides, or combinations thereof.

In some embodiments, the diffusion barrier layer could include a metal or metals. Illustrative metals that can be utilized for the diffusion barrier layer can include molybdenum (Mo), niobium (Nb), nickel (Ni), hafnium (Hf), neodymium (Nd), holmium (Ho), zirconium (Zr), yttrium (Y), uranium (U), iridium (Ir) and silicon (Si). Mo, Nb, Ni, Hf, Nd, Ho, Zr, Y, U and Ir may be useful because of their relatively high melting points, relatively high oxidation resistance, relatively low solubility to gold and relatively good thermal conductivity. Similarly, Mo, Hf, W, Nb, Nd, Ni, Ho, Zr, Y and U may be useful because they have relatively low solubility in both gold (Au) and iron (Fe). Similarly, Si and Ir also have low solubility in Au. In some embodiments, tantalum (Ta), tungsten (W), titanium (Ti), rhodium (Rh), or ruthenium (Ru) may also be utilized in diffusion barrier layers. Any of Ta, W, Ti, Rh, and Ru may be useful because of their relatively high melting points, relatively high oxidation resistance, relatively low solubility to gold and relatively good thermal conductivity. In some embodiments, Ru can be utilized for diffusion barrier layers. In some embodiments where the diffusion barrier layer intersects the disk of the NFT, Ta can be utilized as the diffusion barrier layer material.

In some embodiments, the diffusion barrier layer could include a nitride, oxide, carbide or silicide layer. Illustrative nitrides can include, for example aluminum nitride (AlN), boron nitride (BN), zirconium nitride (ZrN), chromium nitride (CrN), hafnium nitride (HfN), vanadium nitride (VN), titanium aluminum nitride (TiAlN), and titanium silicon nitride (TiSiN). Illustrative nitrides can include, for example titanium nitride (TiN), tungsten nitride (WN) and tantalum nitride (TaN). Illustrative nitrides can also include, for example titanium nitride (TiN). Any of AlN, BN, ZrN, CrN, TiAlN, TiSiN, and TiN may be useful because of their relatively high thermal conductivity, relatively high thermal stability, and relatively high oxidation resistance. Illustrative oxides can include, for example aluminum oxide (AlO), magnesium oxide (MgO), beryllium oxide (BeO), titanium oxide (TiO), tantalum oxide (TaO), niobium oxide (NbO), vanadium oxide (VO), tungsten oxide (WO), zirconium oxide (ZrO), hafnium oxide (HfO), silicon oxide (SiO), and chromium oxide (CrO). Any of AlO, MgO, and BeO may be useful because of their relatively high thermal conductivity, relatively high thermal stability, and relatively high oxidation resistance. Illustrative carbides can include, for example zirconium carbide (ZrC), niobium carbide (NbC), vanadium carbide (VC), hafnium carbide (HfC), silicon carbide (SiC), chromium carbide (CrC), and tantalum carbide (TaC). Illustrative carbides can also include, for example titanium carbide (TiC), and tungsten carbide (WC). TiC or WC may be useful because of their relatively high thermal conductivity, relatively high thermal stability, and relatively high oxidation resistance.

In some embodiments, the diffusion barrier layer can include an amorphous (e.g., grain boundary free material). Grain boundaries in crystalline materials can provide diffusion paths for atoms. Amorphous materials, such as amorphous alloys lack grain boundaries and will prevent or minimize this diffusion. In some embodiments, amorphous alloys can be formed by co-depositing two metals having strong negative heats of mixing. Illustrative amorphous alloys can include, for example Ta—Cr, Nb—Cr, or Zr—Cr.

In some embodiments, a diffusion barrier layer can include a multilayer structure that includes an oxide layer sandwiched by two metal layers. For example, a multilayer diffusion barrier layer could include a 2 nm metal layer/1 to 2 nm conductive oxide layer/2 nm metal layer structure. In some particular illustrative embodiments, such a multilayer diffusion barrier layer could include a 2 nm metal layer/1 to 2 nm conductive oxide layer such as RuO, or IrO/2 nm metal layer. Such multilayer diffusion barrier layers may impair thermal conductivity but may still offer advantages.

Figure 6A:
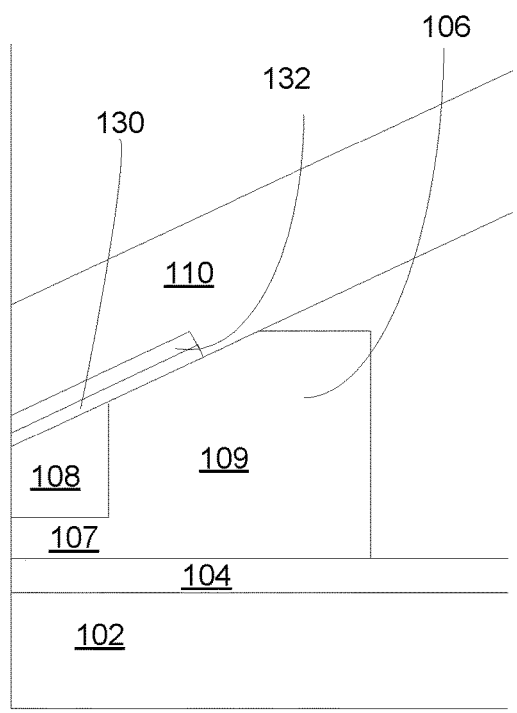
FIGS. 6A and 6B are cross-sectional views of a portion of an illustrative HAMR magnetic recording head disclosed herein that include a diffusion barrier layer and an optional adhesion layer.
Figure 6B:
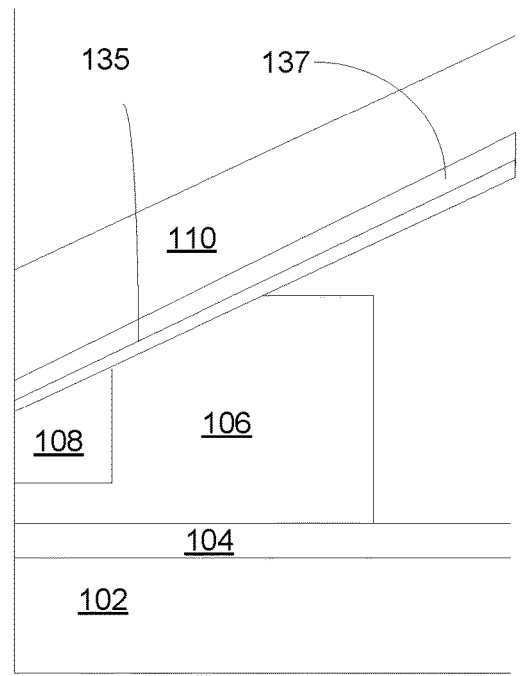

Optionally, an adhesion layer may be added between the diffusion barrier layer and the NPS, NFT, or both to improve the adhesion between the two. FIG. 6A shows a portion of a magnetic recording head that includes a diffusion barrier layer 132 and an adhesion layer 130. The adhesion layer 130 can function to improve the adhesion between the diffusion barrier layer 132 and the NFT 106, the NPS 108, or both. FIG. 6B shows a portion of a magnetic recording head that includes a diffusion barrier layer 137 and an optional adhesion layer 135. In this embodiment, both the diffusion barrier layer and the optional adhesion layer extend back away from the ABS. In this particular embodiment, the diffusion barrier layer and the optional adhesion layer would function to minimize or prevent diffusion from the NPS/pole interface and the entirety of the NFT/pole interface. Diffusion through the pole/back cladding interface would also be prevented or minimized even though such diffusion is not as detrimental because it does not directly affect the peg portion of the NFT. Any type of diffusion barrier layers disclosed or contemplated herein can be utilized in combination with optional adhesion layers.

The optional adhesion layers 130 and 135 can be described by the thickness thereof. In some illustrative embodiments, the adhesion layer can have a thickness of not less than 0.1 nm, or not less than 0.2 nm. In some illustrative embodiments, the adhesion layer can have a thickness of not greater than 10 nm, not greater than 2 nm, or not greater than 1 nm.

The optional adhesion layer can be made of metals, nitrides or oxides for example. Illustrative metals can include, for example titanium (Ti), zirconium (Zr), aluminum (Al), chromium (Cr), nickel (Ni), tantalum (Ta), niobium (Nb), vanadium (V), molybdenum (Mo), and silicon (Si). Illustrative nitrides can include, for example TiN and ZrN. Illustrative oxides can include, for example aluminum oxide (AlO), silicon oxide (SiO), hafnium oxide (Hf), titanium oxide (TiO) and zirconium oxide (ZrO).

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including a diffusion barrier layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface (ABS), the device comprising:
    a write pole;
    a near field transducer (NFT) comprising rhodium (Rh), the NFT comprising a peg and a disk, wherein the peg is at the ABS of the device; and
    a diffusion barrier layer positioned between the write pole and the peg of the NFT and in direct physical contact with at least the write pole and the disk, the diffusion barrier layer having a thickness from about 0.1 nm to about 50 nm and comprising one or more materials selected from:
    molybdenum (Mo), niobium (Nb), nickel (Ni), hafnium (Hf), neodymium (Nd), holmium (Ho), zirconium (Zr), yttrium (Y), uranium (U), iridium (Ir), silicon (Si), tantalum (Ta), tungsten (W), titanium (Ti), rhodium (Rh), and ruthenium (Ru);
    molybdenum (Mo), niobium (Nb), nickel (Ni), hafnium (Hf), neodymium (Nd), holmium (Ho), zirconium (Zr), yttrium (Y), uranium (U), iridium (Ir), silicon (Si), tantalum (Ta), tungsten (W), titanium (Ti), rhodium (Rh), and ruthenium (Ru);
    aluminum nitride (AlN), boron nitride (BN), zirconium nitride (ZrN), chromium nitride (CrN), titanium nitride (TiN), hafnium nitride (HfN), vanadium nitride (VN); titanium aluminum nitride (TiAlN), and titanium silicon nitride (TiSiN);
    aluminum oxide (AlO), magnesium oxide (MgO), beryllium oxide (BeO), titanium oxide (TiO), tantalum oxide (TaO), niobium oxide (NbO), vanadium oxide (VO), tungsten oxide (WO), zirconium oxide (ZrO), hafnium oxide (HfO), silicon oxide (SiO), and chromium oxide (CrO);

titanium carbide (TiC), zirconium carbide (ZrC), niobium carbide (NbC), vanadium carbide (VC), hafnium carbide (HfC), silicon carbide (SiC), chromium carbide (CrC), and tantalum carbide (TaC) and tungsten carbide (WC); and amorphous material.

2. The device according to claim 1 further comprising a dielectric material positioned between the NFT and the pole (NPS).

3. The device according to claim 2, wherein the diffusion barrier layer is positioned at least between the pole and the NPS.

4. The device according to claim 3, wherein the diffusion barrier layer extends away from the ABS between the pole and the disc of the NFT.

5. The device according to claim 1, wherein the diffusion barrier layer intersects the disk of the NFT.

6. The device according to claim 5, wherein the diffusion barrier layer has substantially the same shape as the disc of the NFT.

7. The device according to claim 1, wherein the diffusion barrier layer comprises ruthenium (Ru).

8. The device according to claim 1, wherein the diffusion barrier layer comprises tantalum (Ta).

9. The device according to claim 1, wherein the diffusion barrier layer comprises an amorphous metal alloy.

10. The device according to claim 3 further comprising an adhesion layer positioned between the NPS and the diffusion barrier layer.

11. The device according to claim 9, wherein the adhesion layer has a thickness from about 0.1 nm to about 10 nm.

12. A device having an air bearing surface (ABS), the device comprising:
   a write pole;
   a near field transducer (NFT) comprising rhodium (Rh), the NFT comprising a peg and a disk, wherein the peg is at the ABS of the device;
   a dielectric material positioned between the NFT and the pole (NPS) at the ABS of the device; and
   a diffusion barrier layer intersecting the disk of the NFT and positioned between the NPS and the pole, and the diffusion barrier layer in direct physical contact with at least the write pole and the disk.

13. The device according to claim 12, wherein the diffusion barrier layer comprises one or more materials selected from:
   molybdenum (Mo), niobium (Nb), nickel (Ni), hafnium (Hf), neodymium (Nd), holmium (Ho), zirconium (Zr), yttrium (Y), uranium (U), iridium (Ir), silicon (Si), tantalum (Ta), tungsten (W), titanium (Ti), rhodium (Rh), and ruthenium (Ru);
   aluminum nitride (AlN), boron nitride (BN), zirconium nitride (ZrN), chromium nitride (CrN), titanium nitride (TiN), hafnium nitride (HfN), vanadium nitride (VN); titanium aluminum nitride (TiAlN), and titanium silicon nitride (TiSiN);
   aluminum oxide (AlO), magnesium oxide (MgO), beryllium oxide (BeO), titanium oxide (TiO), tantalum oxide (TaO), niobium oxide (NbO), vanadium oxide (VO), tungsten oxide (WO), zirconium oxide (ZrO), hafnium oxide (HfO), silicon oxide (SiO), and chromium oxide (CrO);
   titanium carbide (TiC), zirconium carbide (ZrC), niobium carbide (NbC), vanadium carbide (VC), hafnium carbide (HfC), silicon carbide (SiC), chromium carbide (CrC), and tantalum carbide (TaC) and tungsten carbide (WC); and
   amorphous material.

14. The device according to claim 12, wherein the diffusion barrier layer comprises tantalum (Ta).

15. The device according to claim 12, wherein the diffusion barrier layer has substantially the same shape as the disc of the NFT.

16. The device according to claim 12, wherein the diffusion barrier layer has a diameter from about 275 nm to about 400 nm.

17. A device having an air bearing surface (ABS), the device comprising:
   a write pole;
   a near field transducer (NFT) comprising rhodium (Rh), the NFT comprising a peg and a disk, wherein the peg is at the ABS of the device;
   a dielectric material positioned between the NFT and the pole (NPS) at the ABS of the device and a diffusion barrier layer positioned between the write pole and the peg of the NFT, the diffusion barrier layer in direct physical contact with at least the write pole and the disk the diffusion barrier layer comprising one or more materials selected from:
   molybdenum (Mo), niobium (Nb), nickel (Ni), hafnium (Hf), neodymium (Nd), holmium (Ho), zirconium (Zr), yttrium (Y), uranium (U), iridium (Ir), silicon (Si), tantalum (Ta), tungsten (W), titanium (Ti), rhodium (Rh), and ruthenium (Ru);
   aluminum nitride (AlN), boron nitride (BN), zirconium nitride (ZrN), chromium nitride (CrN), titanium nitride (TiN), hafnium nitride (HfN), vanadium nitride (VN), tungsten nitride (WN), tantalum nitride (TaN), titanium aluminum nitride (TiAlN), and titanium silicon nitride (Ti SiN);
   aluminum oxide (AlO), magnesium oxide (MgO), beryllium oxide (BeO), titanium oxide (TiO), tantalum oxide (TaO), niobium oxide (NbO), vanadium oxide (VO), tungsten oxide (WO), zirconium oxide (ZrO), hafnium oxide (HfO), silicon oxide (SiO), and chromium oxide (CrO);
   titanium carbide (TiC), zirconium carbide (ZrC), niobium carbide (NbC), vanadium carbide (VC), hafnium carbide (HfC), silicon carbide (SiC), chromium carbide (CrC), tantalum carbide (TaC) and tungsten carbide (WC); and
   amorphous material.

18. The device according to claim 17 further comprising an adhesion layer positioned between the NPS and the diffusion barrier layer.

19. The device according to claim 17, wherein the diffusion barrier layer has a thickness from about 0.2 nm to 5 nm.

20. The device according to claim 17, wherein the diffusion barrier layer is a multilayer structure.

* * * * *